United States Patent [19]

Moriya et al.

[11] 4,122,071
[45] Oct. 24, 1978

[54] WATER-SOLUBLE THERMOSETTING RESINS AND USE THEREOF

[75] Inventors: Koichi Moriya, Shibukawa; Iwao Honda, Maebashi, both of Japan

[73] Assignee: The Japan Carlit Co., Ltd., Tokyo, Japan

[21] Appl. No.: 833,048

[22] Filed: Sep. 14, 1977

[30] Foreign Application Priority Data

Sep. 17, 1976 [JP] Japan .................................. 51-110745

[51] Int. Cl.$^2$ ..................... C08B 11/00; C08B 15/00
[52] U.S. Cl. ................................ 526/17; 162/168 N; 427/288; 526/212; 526/229; 526/292; 526/923; 526/55; 526/23; 260/823
[58] Field of Search ................ 260/72 R, 67 UA; 526/DIG. 923

[56] References Cited

U.S. PATENT DOCUMENTS

| 3,556,932 | 1/1971 | Coscia et al. | 162/166 |
| 3,678,098 | 7/1972 | Lewis et al. | 260/29.6 |

*Primary Examiner*—Herbert J. Lilling
*Attorney, Agent, or Firm*—Flynn & Frishauf

[57] ABSTRACT

Disclosed is a novel water-soluble thermosetting resin which has the property of providing paper with a nearly constant wet and dry strength over a wide pH range according to methods of wet-end additions or surface applications.

12 Claims, No Drawings

WATER-SOLUBLE THERMOSETTING RESINS AND USE THEREOF

BACKGROUND OF THE INVENTION

This invention relates to wet and dry strengthening resins which have the property of being substantially pH-independent and the paper treated with which can be easily repulped. More particularly, it relates to paper strengthening resins mainly composed of thermosetting polyvinylamide polymers which have the property of providing paper with a nearly constant wet and dry strength in the pH range of 3 to 9 in the case of methods of wet-end additions or in the pH range of 3 to 10 in the case of methods of surface applications, and moreover, the paper treated with which can be easily and rapidly repulped.

Paper is generally manufactured by beating pulp and mixing it with beater additives such as size agents, fillers and alum cake. Depending on the nature and amount of such additives, the pH of pulp slurry varies in different ways. In the case of using waste paper alone or using it together with virgin pulp as papermaking materials, a considerable amount of alkaline chemicals remain in the pulp slurry even after washing, because the waste paper is passed through a deinking process wherein alkaline chemicals are added. Consequently, the pH of the pulp slurry depends largely on the extent of washing and the proportion of waste paper used. In these cases, in order to use efficiently various other resins, it is necessary to adjust the pH value of the pulp slurry suitably for each prior art resin.

Various resins such as urea resin, melamine resin and polyamide-epichlorohydrin resin which impart wet and dry strength to paper are known in the art. However, both urea and melamine resins are efficient only in acid pH ranges but have low efficiency at neutral or alkaline pH. On the contrary, polyamide-epichlorohydrin resin imparts wet strength to paper in the alkaline pH ranges, but little wet strength in acid, and furthermore, not enough dry strength is obtained even in alkaline. The wet strength of paper treated with the above prior art resins is nearly permanent and therefore it is difficult to beat the paper even after long immersion in water and beating recovery is not easy.

Paper strengthening resins prepared by reaction of ionic or nonionic polyacrylamide polymers with glyoxal are disclosed in Japanese Patent Publications No. 24,926/1965 and No. 26,670/1969. In the Publication No. 26,670/1969, some methods of producing wet strengthening resins are disclosed, i.e., 2-dimethylaminoethyl methacrylate and acrylamide are polymerized and then the tertiary amino-group in the polymer is quaternized with methylene chloride, dimethyl sulfate or benzyl chloride to cationic polyacrylamide polymer and then the polymer is allowed to react with glyoxal. The paper strengthing resin thus obtained is efficient in the pH range of acid to neutral and as the pH value rises, the efficiency is gradually lowered. At above pH 8, the efficiency is significantly lowered and the resin consequently becomes of no practical use.

A wet strength resin mainly composed of the homopolymer of the cationic monomer prepared by reaction of 2-dimethylaminoethyl methacrylate with epichlorohydrin or copolymers of the cationic monomer with other vinyl monomers is disclosed in U.S. Pat. No. 3,678,098 and Japanese Patent Publication No. 29,126 of 1973. However, in order that the above homopolymer and copolymers may impart sufficient wet strength to paper, it is necessary that the copolymerization ratio of the cationic monomer be over 50 wt.% and this is not preferable from an economical point of view. Moreover, imparting sufficient wet strength to paper is not accomplished without subjecting the resin to caustic activation process just before use.

SUMMARY OF THE INVENTION

It is an object of this invention to provide water-soluble thermosetting resins which impart a nearly constant wet and dry strength to paper over a wide pH range.

It is another object of this invention to provide wet strengthening resins the paper treated with which is easily and rapidly repulped.

It is still another object of this invention to provide a method for the manufacture of paper having wet and dry strength according to methods of wet-end additions.

It is still another object of this invention to provide a method for treating the surface of paper to impart wet and dry strength according to the methods of surface applications.

Other objects and advantages of the present invention will become apparent to those skilled in the art from the following description and disclosure.

DESCRIPTION OF THE PREFERRED EMBODIMENT

We have now found that these objectives have been achieved by the following water-soluble thermosetting polyvinylamide resin having the following formula (I), i.e., the paper strengthing resins of this invention impart a nearly constant wet and dry strength to paper over wide pH range of 3 to 9 in the case of the wet-end additions and of 3 to 10 in the case of surface applications and the paper treated with the resins of this invention can be easily and rapidly broken and therefore the broke recovery matters little.

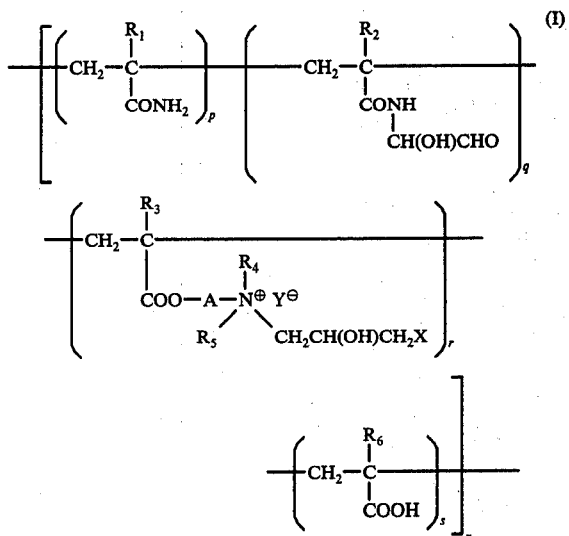

wherein:
$R_1$, $R_2$, and $R_3$ are independently selected from the group consisting of hydrogen and a methyl group,
$R_4$ and $R_5$ are each an alkyl group having 1 to 3 carbon atoms,
A is an alkylene group having 2 to 6 carbon atoms, X is selected from the group consisting of chlorine, bromine and iodine, Y is an anion selected from the group consisting of nitrate ion, chlorine ion, sulfate ion and phosphate ion. $p$, $q$, $r$ and $s$ are molar ratios of the recurring units arranged linearly and irregularly, and are the whole numbers which are $q/(p + q) = 0.1$-$1.0$, $r/(p + q + r + s) = 0.001$-$0.05$ and $s/r = 0.5$-$1.5$; (hereinafter referred to as amphoteric thermosetting polyvinylamide resin) and $s = 0$, $q/(p + q) = 0.1$-$1.0$, $r/(p + q + r) = 0.001$-$0.05$, (hereinafter referred to as cationic thermosetting polyvinylamide resin) and $n$ is about 100 to about 1000.

The paper strengthening resins of this invention are prepared by (1) polymerizing the cationic monomer of the following formula (II) and vinylamide monomers or the above cationic monomer, vinylamide monomers and anionic monomers to produce the cationic or amphoteric polyvinylamide polymers (formula III and IV, respectively), and (2) followed by reaction of the resulting polymers with glyoxal.

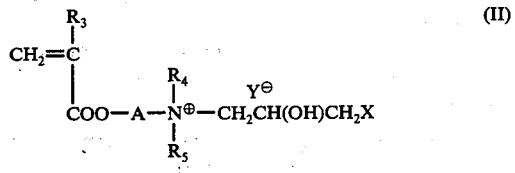

(In the formula, $R_3$ is hydrogen or methyl, $R_4$ and $R_5$ are each ($C_1$-$C_3$) alkyl, A is a ($C_2$-$C_6$) alkylene, X is chlorine, bromine or iodine, and Y is an anion such as nitrate ion, chlorine ion, sulfate ion and phosphate ion.)

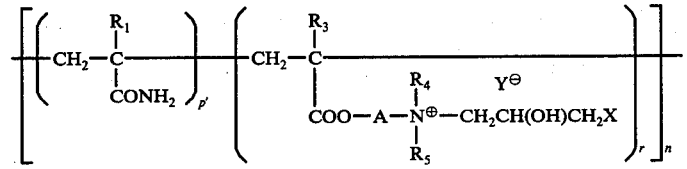

(In the formula, $R_1$, $R_3$-$R_5$, A, X, Y and n are the same as defined in formula I, $p'$ and r are molar ratios of the recurring units arranged linearly and irregularly and also are the whole numbers which are $r/(p' + r) = 0.001$-$0.05$)

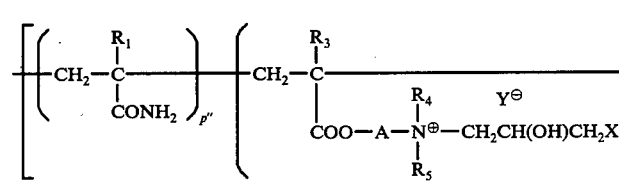

(In the formula, $R_1$, $R_3$-$R_6$, A, X, Y and n are the same as defined in formula I, $p''$, r and s are molar ratios of the recurring units arranged linearly and irregularly and also are the whole numbers which are $r/(p'' + + r + s) = 0.001$-$0.05$ and $s/r = 0.5$-$1.5$)

The cationic monomer of formula (II) is prepared in the same manner as disclosed in the above U.S. Pat. No. 3,678,098, according to the following equation:

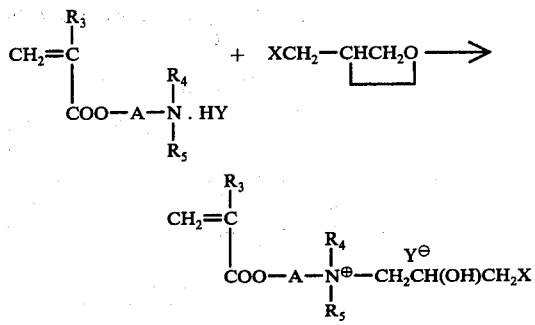

wherein $R_3$ is hydrogen or methyl, $R_4$ and $R_5$ are each ($C_1$-$C_3$) alkyl, preferably $R_4 = R_5 = CH_3$, A is a ($C_2$-$C_6$) alkylene, X is chlorine, bromine or iodine, preferably chlorine, and Y is the anion of an acid having an ionization constant, pKa, of 5.0 or less, preferably chlorine or nitrate ion. For example, by reaction of 2-dimethylaminoethyl methacrylate hydrochloride with epichlorohydrin in aqueous medium at pH of 2 to 6 at 25° to 80° C. for 3 to 10 hours, the cationic monomer is obtained in high yield (over 90%).

The cationic polyvinylamide polymer of formula (III) are prepared by polymerization of the cationic monomer of formula (II) and vinylamide monomers in usual way. For example, by polymerization in water at pH of 2.5 to 4.0, at 50° to 60° C. for 1 to 2 hours in an atmosphere of nitrogen. In this case, it is preferable that the degree of polymerization be adjusted to about 100 to about 1000 by addition of chain transfer agents such as isopropanol. If the degree of polymerization is less than 100, the resulting thermosetting resins do not show good wet and dry strength effect. On the other hand, if the degree of polymerization is more than 1000, the resulting resins show low storage stability, and their viscosity becomes high to lose handling ease. The amount of isopropanol added is preferably 50 to 150 wt.% based on total monomer. Any known polymerization initiator of free radical type effective in aqueous systems such as ammonium persulfate and potassium persulfate can be used. The polymerization molar ratios of the cationic monomer (III), $r/(p' + r)$ are preferably 0.001 to 0.05, more preferably 0.01 to 0.02. In the case of surface applications, the ratios should preferably be within the range of 0.001 to 0.003, since it is essential that no resin be retained by the pulp during paper sheet formation. As vinylamide monomers, water-soluble ones such as acrylamide are preferable. The amphoteric thermosetting polyvinylamide resin prepared by reaction of the amphoteric polyvinylamide polymer (IV), which are produced by polymerization of the cationic monomer, the vinylamide monomer and anionic monomers such as acrylic acid and methacrylic acid as the third recurring unit, with glyoxal are also excellent in efficiency in imparting a nearly constant wet and dry strength to paper over a wide pH range, and moreover, the efficiency is higher than that of the cationic thermosetting polyvinylamide resin which contains no anionic recurring unit. The polymerization ratios of the anionic monomers are preferably 0.5 to 1.5 times that of the cationic monomer, and more preferably are 1.0. When the ratios of the anionic monomers exceed the upper limit of said range, paper strenthening efficiency and storage stability of the resulting resin solution are lowered. Below the lower limit, paper strengthening efficiency is nearly equal to the cationic thermosetting polyvinylamide resin. The polymerization degree of the amphoteric polyvinylamide polymer (IV) is preferably adjusted to about 100 to about 1000 for the same reason as that of the cationic polyvinylamide polymer (III). The polymerization molar ratios of the cationic monomer (II) in the amphoteric polyvinylamide polymer, $r/(p'' + r + s)$ are preferably 0.001 to 0.05, more preferably 0.01 to 0.02, and in the case of surface applications, the ratios should preferably be within the range of 0.001 to 0.003, since it is essential that no resin be retained by the pulp during paper sheet formation.

The method of manufacture of the cationic thermosetting polyvinylamide resin and the amphoteric thermosetting polyvinylamide resin will be hereinafter described. A 10 to 20% by weight aqueous solution of the cationic polyvinylamide polymer (III) or the amphoteric polyvinylamide polymer (IV) will be adjusted to pH of 8.5 to 10.0 with strong bases such as caustic soda and to the solution, 10% by weight glyoxal previously adjusted to pH 7.0 with organic or inorganic bases such as triethanolamine and soda will be added and then the resulted mixed solution will be allowed to react at 30 to 80° C. for 0.5 to 5 hours and cooled. The resulting solution will be stabilized by being adjusted to pH of 2.0 to 4.0 with mineral acids such as hydrochloric acid and nitric acid. The resins of this invention thus obtained are clear, light-yellow colored solution. The amount of glyoxal added; molar ratio $q/[p'(or\ p'') + q]$ should come to be, as previously described, preferably 0.1 to 1.0, more preferably 0.2 to 0.5 from an economical point of view.

In the case of a method for manufacture of paper having wet and dry strength according to methods of wet-end additions, an aqueous solution in proportion of about 0.1 to about 2.0 percent by weight, based on the dry weight of the paper pulp, of the thermosetting resin having the formula (I) is introduced into an aqueous slurry of paper pulp having a pH of 3 to 9. The resulting pulp slurry is formed into a sheet of paper, and then, the paper is dried. If the aqueous solution of the thermosetting resin is less than 0.1 percent by weight, the resulting paper does not show enough improvement in wet and dry strength. On the other hand, if the aqueous solution of the thermosetting resin is more than 2.0 percent by weight, an unnecessarily high degree of wet and dry strength is obtained and the cost will be too high.

In the case of a method for treating the surface of paper to impart wet and dry strength according to methods of surface applications, an aqueous solution having a pH of 3 to 10 of the thermosetting resin of the formula (I) is applied onto the surface of paper so that the amount of the resin in dry base per 1 $m^2$ of the surface of paper becomes about 0.1 to about 2.0 grams, and then, the resulting paper is dried. If the amount of the resin per 1 $m^2$ of the surface of paper is less than 0.1 gram, the resulting paper does not show enough improvement in wet and dry strength. On the other hand, if the amount of the resin per 1 $m^2$ of the surface of paper is more than 2.0 grams, an unnecessarily high degree of wet and dry strength is obtained and the cost will be too high. The methods of the surface application of the resin solution include conventional size press, spray, coating and the like.

The invention will be further illustrated by the following examples. Reference examples illustrate some methods of preparing the cationic monomer (II) used as one of the starting materials in this invention. All parts and percentages referred to herein are by weight unless otherwise indicated.

Reference Example 1

Preparation of cationic monomer (1)

A mixed solution of 236 g. of 2-dimethylaminoethyl methacrylate and 120 ml. of water was acidified to pH 2.0 with 6N nitric acid. To the solution 139 g. of epichlorohydrin was added and the temperature was maintained at 50° C. for 8 hours and thus a pink colored clear solution was obtained. The resulting solution was concentrated under vacuum to isolate white needlelike crystal (about 460 g.) having following formula, followed by recrystallization from aceton which gave 421 g. of purified product (90% yield). N 8.8% (8.95% theoretical). Melting point 108.0° to 109.5° C.

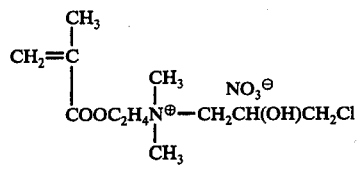

Reference Example 2

Preparation of cationic monomer (2)

The cationic monomer having following formula was prepared in the same way as described in Reference Example 1 except for acidifying with 37% hydrochloric acid instead of 6N nitric acid and the resulting cationic monomer solution remained 50% solution wherein hydroquinone was added as a polymerization inhibitor (0.05% based on the solution) and stored.

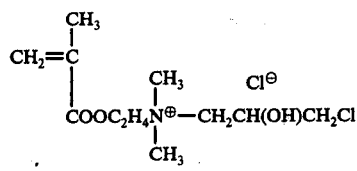

EXAMPLE 1

Preparation of cationic, thermosetting polyacrylamide resin (1)

Into a 1-litter 4-neck flask equipped with reflux condenser, stirrer, thermometer and dropping funnel were placed 420 ml. of water, 100 g. of isopropanol, 99 g. of acrylamide and 1 g. of the cationic monomer obtained in Reference Example 1 and the mixed solution was adjusted to pH 3.0 with ca. 2 ml. of 1N nitric acid. This solution was degassed with a nitrogen purge and heated to 50° C., and then 0.5 g. of ammonium persulfate in 40 ml. of water was gradually added. After the addition, the reaction mixture was polymerized at 60° C. for 2 hours, and was then cooled. About 660 g. of 15% solids solution of cationic polyacrylamide polymer having the following formula was obtained having a pH 2.7 and Gardner-Holdt viscosity of H - I.

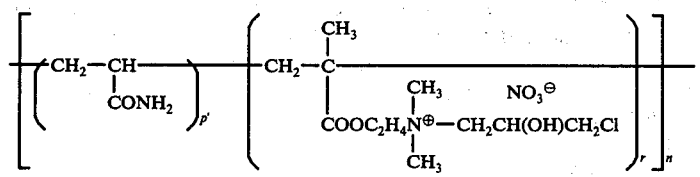

wherein: $r/(p' + r) = 0.0023$, $n$ = about 700.

A 160 g. of the 15% solids solution was diluted with 60 ml. of water and adjusted to pH 9.5 by addition of 1N caustic soda under stirring. To the solution, 56 g. of 10% glyoxal previously adjusted to pH 7.0 was added and then the mixed solution was allowed to react at 60° C. for 2 hours. After cooling to room temperature, the resulting solution was adjusted to pH 3.0 with 1N hydrochloric acid and diluted with water. Thus, ca. 300 g. of 10% cationic thermosetting polyacrylamide resin having the following formula was obtained in the form of a clear, light-yellow colored solution having a Gardner-Holdt viscosity of A.

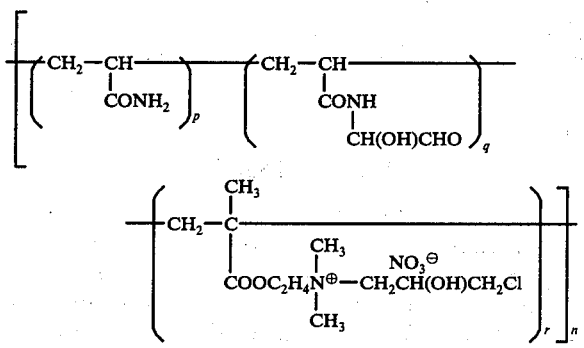

wherein: $q/(p + q) = 0.29$, $r/(p + q + r) = 0.0023$, $n$ = about 700.

EXAMPLE 2

Preparation of cationic, thermosetting polyacrylamide resin (2)

The procedure of Example 1 was repeated, except that 95 g. of acrylamide and 5 g. of the cationic monomer were used. About 300 g. of 10% solids solution of cationic thermosetting polyacrylamide resin having the following formula was obtained having a Gardner-Holdt viscosity of A.

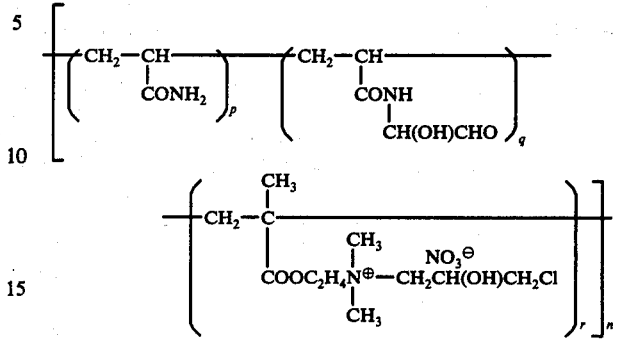

wherein: $q/(p + q) = 0.30$, $r/(p + q + r) = 0.012$, $n$ = about 700.

EXAMPLE 3

Preparation of cationic, thermosetting polyacrylamide resin (3)

The procedure of Example 2 was repeated, except that 10 g. of 50% cationic monomer solution obtained in Reference Example 2 was used instead of 5 g. of cationic monomer obtained in Reference Example 1. About 300 g. of 10% solids solution of cationic, thermosetting polyacrylamide resin having the following formula was obtained having a Gardner-Holdt viscosity of A.

wherein: $q/(p + q) = 0.30$, $r/(p + q + r) = 0.013$, $n$ = about 650.

EXAMPLE 4

Preparation of amphoteric, thermosetting polyacrylamide resin (1)

The procedure of Example 2 was repeated, except that 93.9 g. of acrylamide and 1.2 g. of 98% acrylic acid were used instead of 95 g. of acrylamide. About 300 g. of 10% solids solution of amphoteric, thermosetting polyacrylamide resin having the following formula was obtained having a Gardner-Holdt viscosity of A-B.

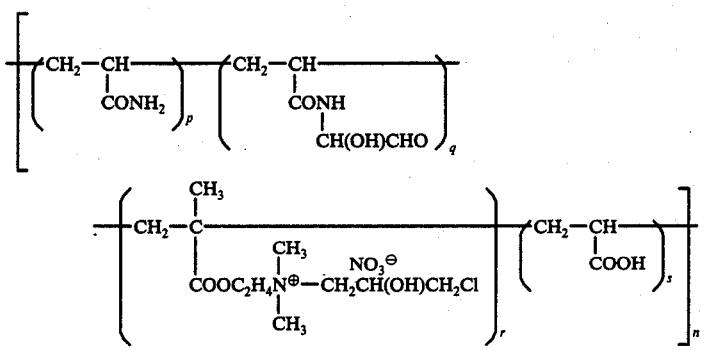

wherein: $q/(p + q) = 0.30$, $r/(p + q + r + s) = 0.012$, $s/r = 1.0$, $n =$ about 750.

EXAMPLE 5

Preparation of amphoteric, thermosetting polyacrylamide resin (2)

The procedure of Example 4 was repeated, except that 1.2 g. of 98% acrylic acid and 5 g. of cationic monomer obtained in Reference Example 1 were replaced by 1.4 g. of 97% methacrylic acid and 10 g. of 50% cationic monomer solution obtained in Reference Example 2, respectively. About 300 g. of 10% solids solution of amphoteric, thermosetting polyacrylamide resin having the following formula was obtained having a Gardner-Holdt viscosity of A-B.

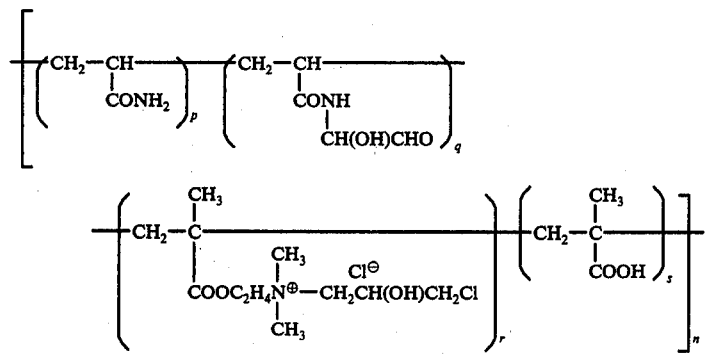

wherein: $q/(p + q) = 0.30$, $r/(p + q + r + s) = 0.013$, $s/r = 0.90$, $n =$ about 700.

Comparative Example 1

Into the flask of Example 1 were placed 420 ml. of water, 100 g. of isopropanol, 95 g. of acrylamide and 5 g. of 2-dimethylaminoethyl methacrylate and the mixed solution was then degassed with a nitrogen purge and heated to 50° C., and then 0.5 g. of ammonium persulfate in 40 ml. of water was gradually added. After the addition, the reaction mixture was polymerized at 60° C. for 2 hours, and then the tertiary amino-groups in the polymer were quaternized with dimethyl sulfate and thus, 15% solids solution of cationic polymer was obtained.

The mixed solution of 160 g. of the above solution, 10% glyoxal (the pH of which was not adjusted) and 60 ml. of water was adjusted to pH 7.5 with 1N caustic soda under stirring, and the solution was then allowed to react at 50° C. for 3 hours. After cooling to room temperature, the resulting solution was adjusted to pH 4.0 with 1N hydrochloric acid and diluted with water.

Thus, an 10% solids solution of cationic, thermosetting resin having the following formula was obtained.

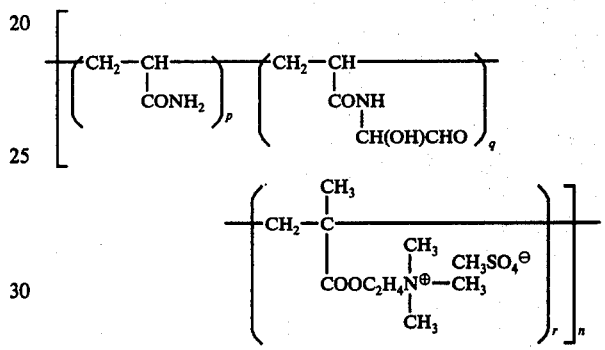

wherein: $q/(p + q) = 0.30$, $r/(p + q + r) = 0.023$, $n =$ about 700.

EXAMPLE 6

The following illustrates wet and dry strengthening efficiency of the resins obtained in Examples 2 to 5 and Comparative Example 1.

To an aqueous slurry of paper pulp (NBKP, 7° SR) of 2.0% consistency; said slurry being adjusted to pH 3.0, 4.0, 7.0, 8.0 and 9.0, was added each resin above described to provide 1% solution of each resin based on dry weight of the pulp. Hand sheets having a basis weight of 60 g./m² were prepared with a TAPPI Standard sheet machine, followed by dehydration, air-dry and drying at 105° C. for 15 minutes.

After conditioning at 20° C. and 65% RH for 24 hours, wet and dry strengths of the resulting sheets were measured according to JIS P 8113 and JIS P 8135.

Wet strength was measured after one minute of immersion in water having a temperature of 20° C. and a pH of 7. The results are given in Table 1.

Table 1

| Resin* | Dry Breaking Length (Km) pH of pulp slurry | | | | | Wet Breaking Length (Km) pH of pulp slurry | | | | |
|---|---|---|---|---|---|---|---|---|---|---|
| | 3.0 | 4.0 | 7.0 | 8.0 | 9.0 | 3.0 | 4.0 | 7.0 | 8.0 | 9.0 |
| Control | — | — | 2.50 | — | — | — | — | 0.15 | — | — |
| 1 | 6.90 | 7.13 | 7.32 | 7.25 | 7.18 | 1.64 | 1.78 | 1.86 | 1.78 | 1.71 |
| 2 | 6.86 | 7.05 | 7.21 | 7.11 | 7.02 | 1.58 | 1.67 | 1.70 | 1.67 | 1.59 |
| 3 | 7.15 | 7.24 | 7.36 | 7.31 | 7.20 | 1.93 | 1.98 | 1.98 | 1.96 | 1.81 |
| 4 | 7.11 | — | 7.38 | — | 7.15 | 1.88 | — | 1.90 | — | 1.76 |
| 5 | — | — | 5.75 | — | — | — | — | 0.31 | — | — |
| 6 | 6.00 | 6.48 | 6.41 | 6.20 | 5.27 | 1.28 | 1.58 | 1.42 | 1.23 | 0.77 |

*1. Cationic, thermosetting resin obtained in Example 2
2. Cationic, thermosetting resin obtained in Example 3
3. Amphoteric, thermosetting resin obtained in Example 4
4. Amphoteric, thermosetting resin obtained in Example 5
5. Cationic polymer obtained in Example 2
6. Cationic, thermosetting resin obtained in Comparative Example 1

EXAMPLE 7

The following illustrates wet and dry strengthening efficiency as a surface application agent of the resins obtained in Examples 1, 2 and 4, and Comparative Example 1.

Each resin solution was diluted with water and adjusted to pH of 3.0, 5.0, 7.0, 9.0 and 10.0 of 1% solution by addition of acid or base. A sheet of No. 2 filter paper (basis weight of 120 g./m$^2$, Toyo Filter Paper Co.) was immersed in the 1% solution for one minute and pressed through press roll and then dried at 150° C. for 2 minutes. The amount of each resin (in dry base) per 1 m$^2$ of the surface of paper was 1.0 gram, respectively. After conditioning at 20° C. and 65% RH for 24 hours, wet and dry strength of the resulting paper were measured in the same way as described in Example 6. The results are given in Table 2. In any case, dry breaking length was nearly constant (3.8–4.0 Km) in the pH range of 3 to 10, except for in the case of control (2.5 Km).

Table 2

| Resin* | Wet Breaking Length (Km) pH of 1% resin solution | | | | |
|---|---|---|---|---|---|
| | 3.0 | 5.0 | 7.0 | 9.0 | 10.0 |
| Control | — | — | 0.12 | — | — |
| 7 | 1.14 | 1.25 | 1.25 | 1.22 | 1.18 |
| 1 | 1.25 | 1.34 | 1.34 | 1.31 | 1.32 |
| 3 | 1.47 | 1.49 | 1.49 | 1.46 | 1.39 |
| 5 | 0.22 | 0.42 | 0.45 | 0.44 | 0.32 |
| 6 | 1.06 | 1.21 | 1.05 | 0.85 | 0.41 |

*Resin 1, 3, 5 and 6 are the same as defined in Example 6.
Resin 7 is cationic, thermosetting resin obtained in Example 1.

EXAMPLE 8

The following illustrates the repulping of wet-strength broke treated with the results of this invention.

To an aqueous pulp (NBKP, 7° SR) of 2.0% consistency, was added the resin obtained in Examples 2 or 4 to provide 1% solution based on dry weight of the pulp. Hand sheets having a basis weight of 60 g./m$^2$ were then prepared with a TAPPI Standard sheet machine at pH 7.0 at 20° C. Into a standard beating was placed 3 g. of the hand sheets and 1.5 liter of water and then broken for 20 minutes. In both cases, the hand sheets were completely broken.

What is claim is:

1. A thermosetting resin of the formula

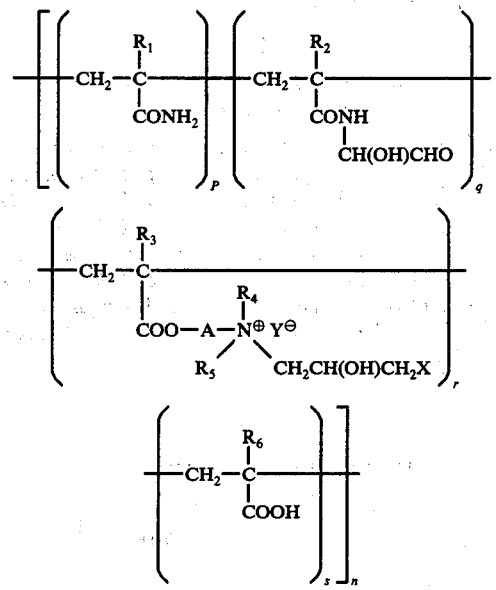

wherein:
  $R_1$, $R_2$ and $R_3$ are independently selected from the group consisting of hydrogen and a methyl group,
  $R_4$ and $R_5$ are each an alkyl group having 1 to 3 carbon atoms,
  A is an alkylene group having 2 to 6 carbon atoms,
  X is selected from the group consisting of chlorine, bromine and iodine,
  Y is an anion selected from the group consisting of nitrate ion, chlorine ion, sulfate ion and phosphate ion,
  p, q, r and s are molar ratios of the recurring units arranged linearly and irregularly, and are the whole numbers which are $q/(p + q) = 0.1$–$1.0$, $r/(p + q + r + s) = 0.001$–$0.05$ and $s/r = 0.5$–$1.5$; or $s = 0$, $q/(p + q) = 0.1$–$1.0$, $r/(p + q + r) = 0.001$–$0.05$, and n is about 100 to about 1000.

2. The resin of claim 1 wherein p, q, r and s are molar ratios of the recurring units arranged linearly and irregularly, and are the whole numbers which are $q/(p + q) = 0.1$–$1.0$, $r/(p + q + r + s) = 0.001$–$0.05$, $s/r = 0.5$–$1.5$.

3. The resin of claim 2 wherein $R_1$, $R_2$ and $R_6$ are each hydrogen, and $R_3$, $R_4$ and $R_5$ are each a methyl group and X is chlorine.

4. The resin of claim 2 wherein $R_1$ and $R_2$ are each hydrogen, and $R_3$, $R_4$, $R_5$ and $R_6$ are each a methyl group and X is chlorine.

5. The resin of claim 3 wherein Y is a nitrate ion.
6. The resin of claim 4 wherein Y is a nitrate ion.
7. The resin of claim 3 wherein Y is a chlorine ion.
8. The resin of claim 4 wherein Y is a chlorine ion.
9. The resin of claim 1 wherein $s = 0$; $p$, $q$ and $r$ are molar ratios of the recurring units arranged linearly and irregularly, and are the whole numbers which are $q/(p + q) = 0.1\text{--}1.0$, $r/(p + q + r) = 0.001\text{--}0.05$.
10. The resin of claim 9 wherein $R_1$ and $R_2$ are each hydrogen, and $R_3$, $R_4$ and $R_5$ are each a methyl group and X is chlorine.
11. The resin of claim 10 wherein Y is a nitrate ion.
12. The resin of claim 10 wherein Y is a chlorine ion.

* * * * *